US010888098B2

(12) United States Patent
Ebbers

(10) Patent No.: US 10,888,098 B2
(45) Date of Patent: Jan. 12, 2021

(54) LIFTING APPARATUS, DESIGNED TO LIFT POULTRY LEGS CONVEYED HANGING IN A ROW

(71) Applicant: LINCO FOOD SYSTEMS A/S, Trige (DK)

(72) Inventor: Hermanus Godefridus Wilhelmus Ebbers, Angerlo (NL)

(73) Assignee: LINCO FOOD SYSTEMS A/S, Trige (DK)

( * ) Notice: Subject to any disclaimer, the term of this patent is extended or adjusted under 35 U.S.C. 154(b) by 0 days.

(21) Appl. No.: 16/639,874

(22) PCT Filed: Aug. 20, 2018

(86) PCT No.: PCT/EP2018/072438
§ 371 (c)(1),
(2) Date: Feb. 18, 2020

(87) PCT Pub. No.: WO2019/038231
PCT Pub. Date: Feb. 28, 2019

(65) Prior Publication Data
US 2020/0359638 A1 Nov. 19, 2020

(30) Foreign Application Priority Data

Aug. 21, 2017 (DE) .................. 10 2017 119 059

(51) Int. Cl.
*A22C 21/00* (2006.01)
(52) U.S. Cl.
CPC ...... *A22C 21/0046* (2013.01); *A22C 21/0053* (2013.01)
(58) Field of Classification Search
CPC . A22C 21/00; A22C 21/0007; A22C 21/0046; A22C 21/0053
(Continued)

(56) References Cited

U.S. PATENT DOCUMENTS

| 3,380,113 A | 4/1968 | Zebarth |
| 3,537,127 A | 11/1970 | Brugman |

(Continued)

FOREIGN PATENT DOCUMENTS

| EP | 0 391 467 | 10/1990 |
| WO | 2015/117668 | 8/2015 |

OTHER PUBLICATIONS

PCT Search Report and Written Opinion (with English translation) issued in PCT/EP2018/072438.

*Primary Examiner* — Richard T Price, Jr.
(74) *Attorney, Agent, or Firm* — Greenblum & Bernstein, P.L.C.

(57) ABSTRACT

A lifting apparatus (1), configured to lift poultry legs (9) conveyed suspended in a row, comprises a conveying device (11) and a poultry leg lifting device (12). The poultry legs (9) can be suspended by their ankle joint balls (911) in poultry carriers (131) of the conveying device (11). The poultry leg lifting device (12) has a poultry leg positioning device (70) having at least one positioning element (71-78, 141) which, with weight unloading of the poultry carrier (131), lifts the conveyed poultry legs (9) with the ankle joint balls (911) in a poultry leg lifting way (h) into lifted ankle joint ball positions. A carrier lifting device (13) is configured to lift each foot hook-in device (31) to suspension heights which correspond with the ankle joint ball positions lifted in the poultry leg lifting device (12). For this purpose, the carrier guiding device (132) has a dynamically movable lifting guiding member (4) and a guiding bearing device (42) which carries the lifting guiding member (4), in conjunction with a weight unloading of the poultry carriers (131) effected by the lifting of the poultry legs (9), in a vertically movable manner. The foot hook-in device (31) is mounted on the (Continued)

Figure 1:
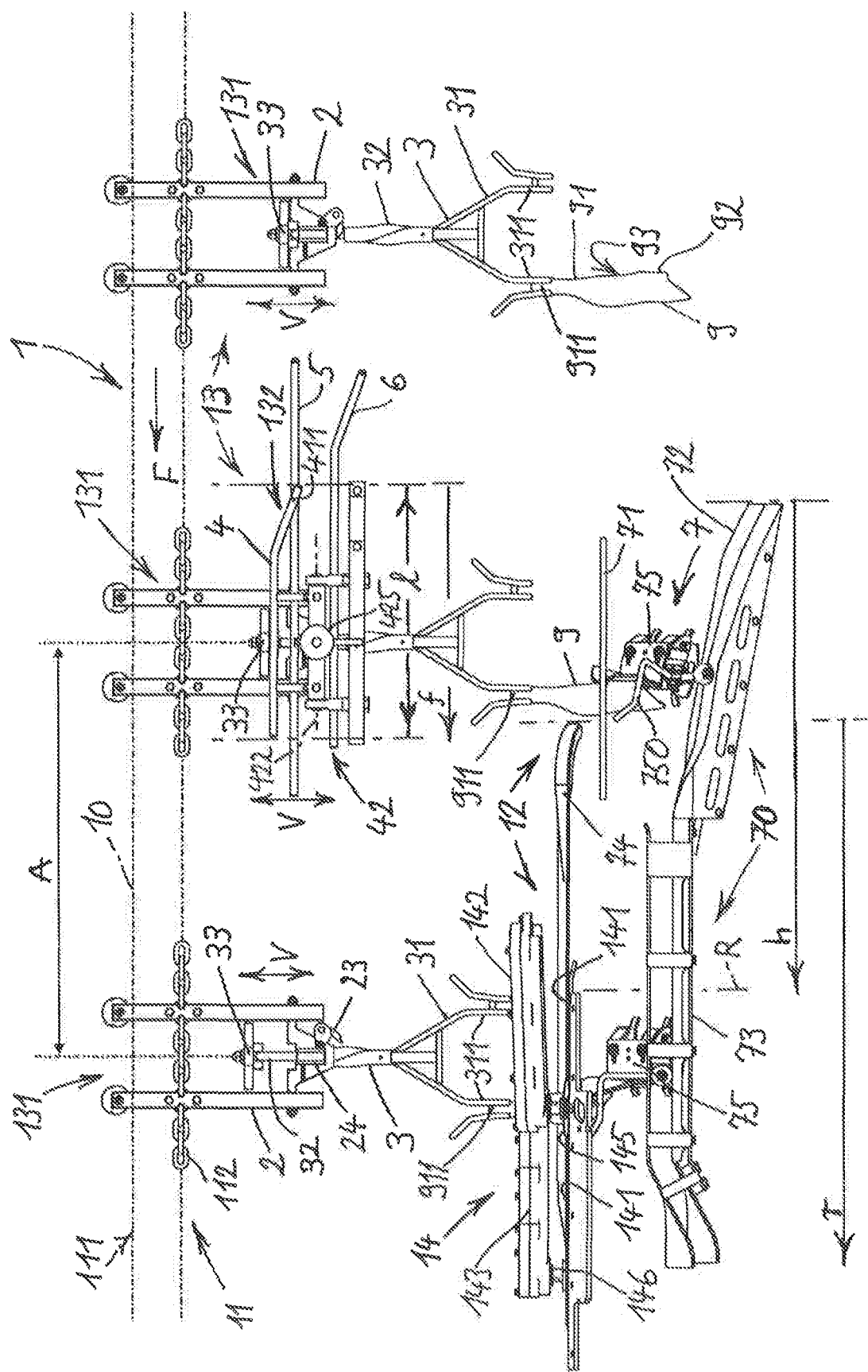

poultry carrier (131) in such a manner that it is freely vertically movable.

23 Claims, 3 Drawing Sheets

(58) Field of Classification Search
 USPC .................................................. 452/177–180
 See application file for complete search history.

(56) References Cited

U.S. PATENT DOCUMENTS

| | | |
|---|---|---|
| 5,125,498 A | 6/1992 | Meyn |
| 6,450,872 B1 | 9/2002 | Haley |
| 9,795,149 B2 | 10/2017 | Ebbers |
| 2017/0006883 A1 | 1/2017 | Ebbers |

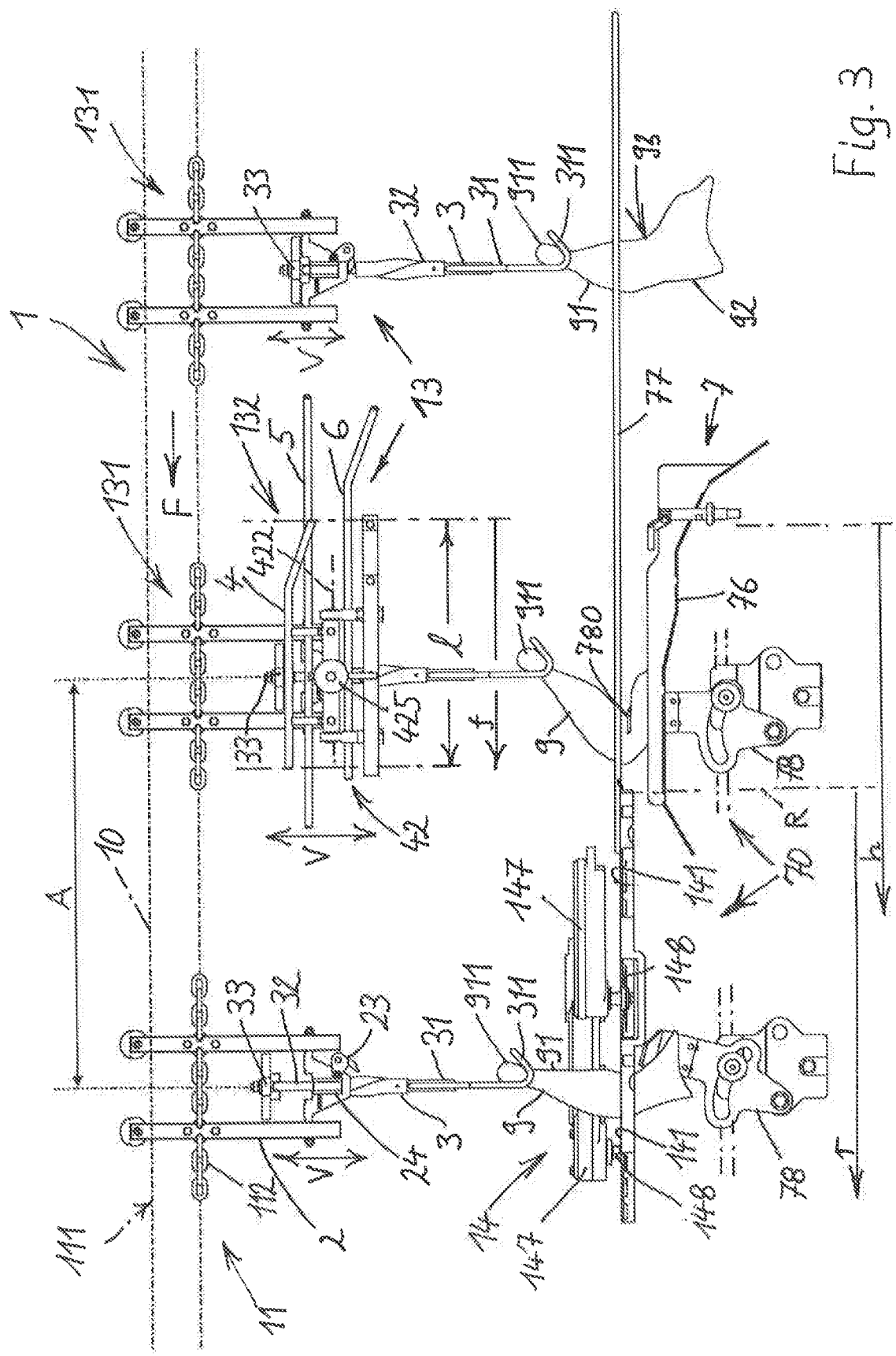

LIFTING APPARATUS, DESIGNED TO LIFT POULTRY LEGS CONVEYED HANGING IN A ROW

The invention relates to a lifting apparatus, configured to lift poultry legs conveyed suspended in a row, comprising a conveying device having poultry carriers which are movable along a conveying strand in a straight conveying line and in the direction of conveyance, wherein each poultry carrier has a carrier suspension part suspended from the conveying strand and a foot carrying part on which there is formed a foot hook-in device in which at least one poultry leg can be suspended by means of the ankle joint ball of the poultry leg for suspended conveying, and a poultry leg lifting device which has a poultry leg positioning device having at least one positioning element associated with a poultry leg lifting way, which positioning element, outside the foot hook-in devices, with weight unloading of the poultry carrier, comes into engagement with the conveyed poultry legs in such a manner that the conveyed poultry legs, and thus the ankle joint balls thereof, can thereby be lifted in the poultry leg lifting way into lifted ankle joint ball positions and consequently are lifted.

Lifting apparatuses of the generic type are known from WO 2015/117668 A1. Each laterally or axially conveyed poultry leg is lifted from a suspended starting position into a reference position in which it is conveyed further and in particular processed in a leg holding and guiding device. Lifting of the poultry leg into the lifted reference position takes place in that positioning elements of a poultry leg lifting device engage the poultry leg in order to thread it at the location of the knee joint in the reference position into a holding and guiding gap of the leg holding and guiding device. Details of such lifting apparatuses will be found in WO 2015/117668 A1, to which reference is made. It is important that, as the poultry leg is lifted, the ankle joint ball of the poultry leg is also lifted. As long as the poultry leg is not lifted, the ankle joint ball is suspended in the foot hook-in device, for example in a U-shaped carrier hanger of the poultry carrier, in the normal suspended position. The foot hook-in device then carries the poultry leg with its entire weight. However, if the poultry leg is lifted, the weight load is then transferred to the positioning elements of the poultry leg lifting device and, when the poultry leg is conveyed further therein, to the leg holding and guiding device. As is described in detail in WO 2015/117668 A1, the ankle joint ball must be movable upwards upon transfer of the load bearing in the foot hook-in device, in particular it must be able to be deflected upwards in a sliding manner in the carrier hanger. In practice, this deflection movement of the ankle joint ball upwards may be impeded or even prevented. This is because the conveying devices are equipped with uniform or standardised foot hook-in devices which are inherently designed to receive the ankle joint balls as far as possible in a non-clamping manner, and because the size and/or shape of the ankle joint balls vary as a result of only slight anatomical differences, with the consequence that some ankle joint balls become jammed in the foot hook-in devices. Ankle joint balls of the affected poultry legs then cannot be lifted sufficiently freely so that, in particular upon lifting, there is incorrect positioning and in particular interrupted operation and thus possibly also breakdown of the poultry leg lifting device.

The object underlying the invention is to ensure, when lifting conveyed poultry legs in a poultry leg lifting way and, if necessary, also when maintaining lifted positions, sufficiently free and smooth vertical movability of ankle joint balls of the poultry legs suspended in poultry carriers during conveying, in order to avoid incorrect positioning and breakdown.

In conjunction with the features of the lifting apparatus mentioned hereinbefore, the object is achieved by a carrier lifting device comprising the poultry carriers and a carrier guiding device arranged in the region of the poultry leg lifting device, wherein each poultry carrier carries the foot carrying part on the carrier suspension part in a freely vertically movable manner for vertical adjustment between a fixed lower suspension height and suspension heights lying above that lower suspension height, and wherein the carrier guiding device has a dynamically movable lifting guiding member, which is arranged in the region of the poultry leg lifting device with a guiding way associated with at least a portion of the poultry leg lifting way, and a guiding bearing device which carries the lifting guiding member, in conjunction with the weight unloading of the poultry carriers effected by the lifting of the poultry legs, in such a manner that it is dynamically vertically movable by lowering and lifting, wherein the lifting guiding member is arranged for engagement with the foot carrying part, in such a manner that each foot hook-in device is lifted along the guiding way by means of the foot carrying part to suspension heights which correspond with the ankle joint ball positions lifted in the poultry leg lifting device.

By means of the measures according to the invention, when the load is transferred from the poultry carrier to carrying parts such as positioning elements and/or guiding elements of the poultry leg lifting device, the ankle joint ball is movable or deflectable upwards sufficiently freely and also particularly smoothly together with the foot carrying part of the poultry carrier during the lifting of the poultry leg and/or in the lifted position. Undisturbed conveying and, in particular, qualitatively unimpaired processing is also ensured when the ankle joint ball is fixed or clamped in the foot hook-in device. A particular measure consists in that, with the association of the guiding way of the lifting guiding member with at least a portion of the poultry leg lifting way, by means of the dynamic mounting of the lifting guiding member the mentioned load transfer is used to facilitate and assist, and thus make smooth, the guided lifting of the foot carrying parts to the suspension heights of the foot hook-in devices which correspond with the ankle joint ball lifted positions brought about, in particular in succession, in the poultry leg lifting way, in dependence on the lifting state of the poultry leg or legs in a poultry carrier. The dynamic guiding movement effected by weight unloading or neutralisation, with a degree of freedom for lowering and lifting the lifting guiding member, adapts the suspension heights of successive poultry legs that are to be lifted, or positioned, even where there are anatomical variations and/or different thigh or drumstick lengths.

Advantageously, the foot carrying part is mounted on the carrier suspension part by means of a sliding bearing in such a manner that the vertical adjustment in a straight line is configured telescopically. The vertical adjustment of the carrier carrying part, which follows the guiding member, is thus configured without a pivot movement.

The guiding way of the dynamically movable lifting guiding member advantageously has a guiding length which, at most, is equal to the conveying distance between two successive poultry carriers, wherein it ends at a conveying position of the poultry carrier at which a defined lifted ankle joint ball position is achieved at the end of the poultry leg lifting way. There is achieved not only mutually independent lifting of successive foot carrying parts, but also particularly precise lifting of the ankle joint ball at the defined point, which in particular can be used as the reference lifting position for the further conveying and processing of the poultry leg by means of a leg holding and guiding device.

Optimal adaptation of the guiding way of the dynamically mounted lifting guiding member to the poultry lifting way can be configured in that the lifting guiding member is formed by an ascending rising guiding portion and a following horizontal guiding portion, wherein the rising guiding portion has, in comparison with the horizontal guiding portion, a small guiding length, which is advantageously associated only with an entry region of the poultry leg lifting way of the poultry leg lifting device. The rising guiding portion and the horizontal guiding portion are advantageously permanently connected together, for example as parts of a one-piece guiding body. Simultaneous lifting and lowering of the lifting guiding member into a lowermost lifting position can in particular be effected. In particular for this configuration of the dynamic lifting guiding member, the guiding bearing device is so configured that the dynamic lifting guiding member is vertically movable parallel to the straight conveying line.

A maximum lifting height of the lifting guiding member, in particular taking into account a region which can be occupied by an ankle joint ball above a reference height position at the end of the poultry leg lifting way, can be provided by an associated height stop on the carrier guiding device.

Advantageously, the guiding bearing device carries the lifting guiding member dynamically against adjustable counter force or restoring force which, when the foot carrier part to be lifted engages with the lifting guiding member, counteracts a weight force which loads the lifting guiding member. By means of the adjustable counter force/restoring force, which is adjustable, for example, by means of a counter weight which is displaceable along a lever, the lowering and lifting of the lifting guiding member can be adapted particularly simply, purposively and effectively to weight ranges or weight groups of poultry legs, and anatomical differences can also be matched. In addition, the lifting guiding determined by the weight unloading can be adapted to the manner of the in particular successive lifting of a poultry leg or of a poultry leg pair, for example in accordance with a poultry leg positioning device in the poultry leg lifting way. For example, an adaptation to a bending operation, by means of which the poultry legs are positioned and lifted, takes place. In particular, different bending operations consist in that on the one hand the poultry leg is conveyed laterally. As is described in detail in WO 2015/117668 A1, lateral conveying is defined in that, during conveying, one of the lateral sides of the poultry leg is leading or in front. On the other hand, the poultry leg can be conveyed, for example, axially with the patella leading. Axial conveying is to be understood as meaning that the poultry leg is conveyed with the axial side of the leg, on which the patella or the hollow of the knee is located, leading or in front.

An adjustment of the counter force/restoring force consists in that the lifting guiding member, in a carrier insertion position, in which the foot carrying parts come into engagement with the dynamic lifting guiding member, is movable into a lower guiding position which is established when the dynamic lifting guiding member is loaded with a weight force greater than the counter force/restoring force. For adaptation to weight ranges, size or anatomical variations of the poultry legs and/or weight influencing due to different bending operations, it is particularly advantageous that the lifting guiding member, in a carrier insertion position, in which the foot carrying parts come into engagement with the lifting guiding member, is settable, by adjustment of the restoring force, into a desired lifted floating guiding position with a floating region, which position is established when the lifting guiding member is loaded with a weight force that is balanced by the restoring force. The interplay between the weight loading and the weight unloading can be so adjusted, if required, that the lifting guiding member, on first engagement of the foot carrying parts or at a later time on passing through the lifting guiding way, moves into the floating guiding position, in which the weight acting on the foot carrying part is balanced out. For the first lifting, the lifting guiding member can be formed on the entry side with an ascending portion. Floating region is understood as meaning a height region around the neutral floating guiding position.

In a preferred configuration of the carrier guiding device, the guiding bearing device has at least one lifting pivot bearing device having a two-sided lever which is determined by two lateral levers and is pivotable about a bearing pivot axis which in particular is parallel to the straight conveying line, wherein the first lateral lever carries the dynamic lifting guiding member and the second lateral lever carries a counter weight providing a restoring force.

Advantageously, there is arranged on each poultry carrier a controllable arresting element which preferably automatically blocks the vertical adjustment between the carrier suspension part and the foot carrying part, wherein the carrier guiding device of the lifting apparatus has an unlocking control member which, at a conveying position which is in advance of an insertion position of the poultry legs into the carrier lifting device, can be brought into engagement with the arresting element in order to enable the vertical adjustment between the carrier suspension part and the foot carrying part.

Foot hook-in devices of some poultry carriers can be so configured, for example by at least one hanger, that they allow at least some ankle joint balls to be lifted freely when the poultry legs are lifted. On the other hand, foot hook-in devices can be provided which in particular fix all the ankle joint balls, that is to say immobilise them in the foot hook-in devices.

Expediently, the foot hook-in device for the mentioned lateral conveying is designed for the suspension of two, left and right, poultry legs of a bird which are separate from one another, in particular in a pair, and are to be conveyed one behind the other. For the mentioned axial conveying, the foot hook-in device is designed for the suspension of two poultry legs which are separate from one another and are to be conveyed side by side.

Expediently, the poultry leg lifting device has a leg bending device having at least one positioning element which bends each conveyed poultry leg at the knee joint and brings the ankle joint ball into a lifted, preferably defined ankle joint ball position. In one configuration, at least one conveying portion of the poultry leg lifting device is formed by a leg holding and guiding device which has at least one positioning element and which holds and guides the poultry legs, which are conveyed by means of the poultry carriers and in particular are already substantially lifted, in a reference conveying way with their ankle joint balls lifted. As soon as a poultry leg, after reaching a particular lifted ankle joint ball position, is no longer lifted by means of the poultry leg lifting device and is not held in the lifted position, a load transfer to the foot carrying part of the poultry carrier can take place, provided that the foot carrying part is no longer in engagement with the dynamic lifting guiding member.

The poultry leg is then conveyed in the normal suspended position, that is to say without the foot carrying part being lifted.

Expediently, it is provided, as already mentioned and described in detail in WO 2015/117668 A1, that the poultry leg lifting device comprises a leg holding and guiding device which holds and guides poultry legs lifted into a defined position and conveyed by means of the poultry carriers in a reference conveying way with their ankle joint balls lifted. Advantageously, the leg holding and guiding device has a holding and guiding gap in which the poultry legs can be suspended in a vertical orientation by means of their knee joints. The arrangement can be such that the ankle joint balls are thereby lifted from a lower position into an upper position. The holding and guiding gap can be preceded, in particular in the case of lateral conveying, by a guiding reference edge which holds the poultry legs in a defined lifted position and optionally lifts them further. The poultry leg lifting device having the leg holding and guiding device can be so configured that the guiding way of the lifting guiding member ends at a conveying position of the poultry carrier which is associated with a position at the start of the reference conveying way, and that the foot carrying parts are mounted on the carrier suspension parts in such a manner that they are freely vertically movable along the reference conveying way. The foot carrying parts, when they leave the lifting guiding member, are then supported on the ankle joint balls, which are clamped in the foot hook-in devices. Guiding of the poultry leg at the desired height is thereby carried out by means of the leg holding and guiding device. In particular, the drumstick in the case of lateral conveying of the poultry leg and the thigh in the case of axial conveying is guided at a defined height and can be processed precisely at one or more processing stations for the removal of meat. The ankle joint balls can be lifted in the leg holding and guiding device during conveying along a mentioned guiding reference edge or the holding guiding gap, in particular in dependence on varying lengths of the drumstick.

A carrier guiding device according to the invention can be so arranged that the conveying way of the lifting guiding member at least in part covers at least a portion, preferably a starting portion, of a leg holding and guiding device.

In a configuration that is particularly advantageous from the point of view of construction, the lifting guiding member is formed by a pair of lifting guiding rods which are formed and mounted symmetrically with respect to a vertical conveying mid-plane, and the foot carrying part of each poultry carrier has a carrier guiding element, for example a carrier guiding web oriented transversely to the conveying line, which can be attached to the pair of lifting guiding rods for engagement with the lifting guiding member.

Dependent claims are directed to the mentioned embodiments of the invention and to other expedient and advantageous embodiments. Only particularly expedient and advantageous forms and possibilities of embodiment are described in greater detail with reference to the following description of the exemplary embodiments shown in the schematic drawings. Any single or detailed feature described within an exemplary embodiment is to be understood as being an independent detailed example for other embodiments or forms which fall under the invention and which are not described or are not described in full. In particular, a general feature denotes and is understood as being a feature which, even when isolated from other features of a combination or of an exemplary embodiment, contributes towards the success according to the invention of the general teaching of the invention, in particular according to the main claim.

In the drawings

Figure 2:
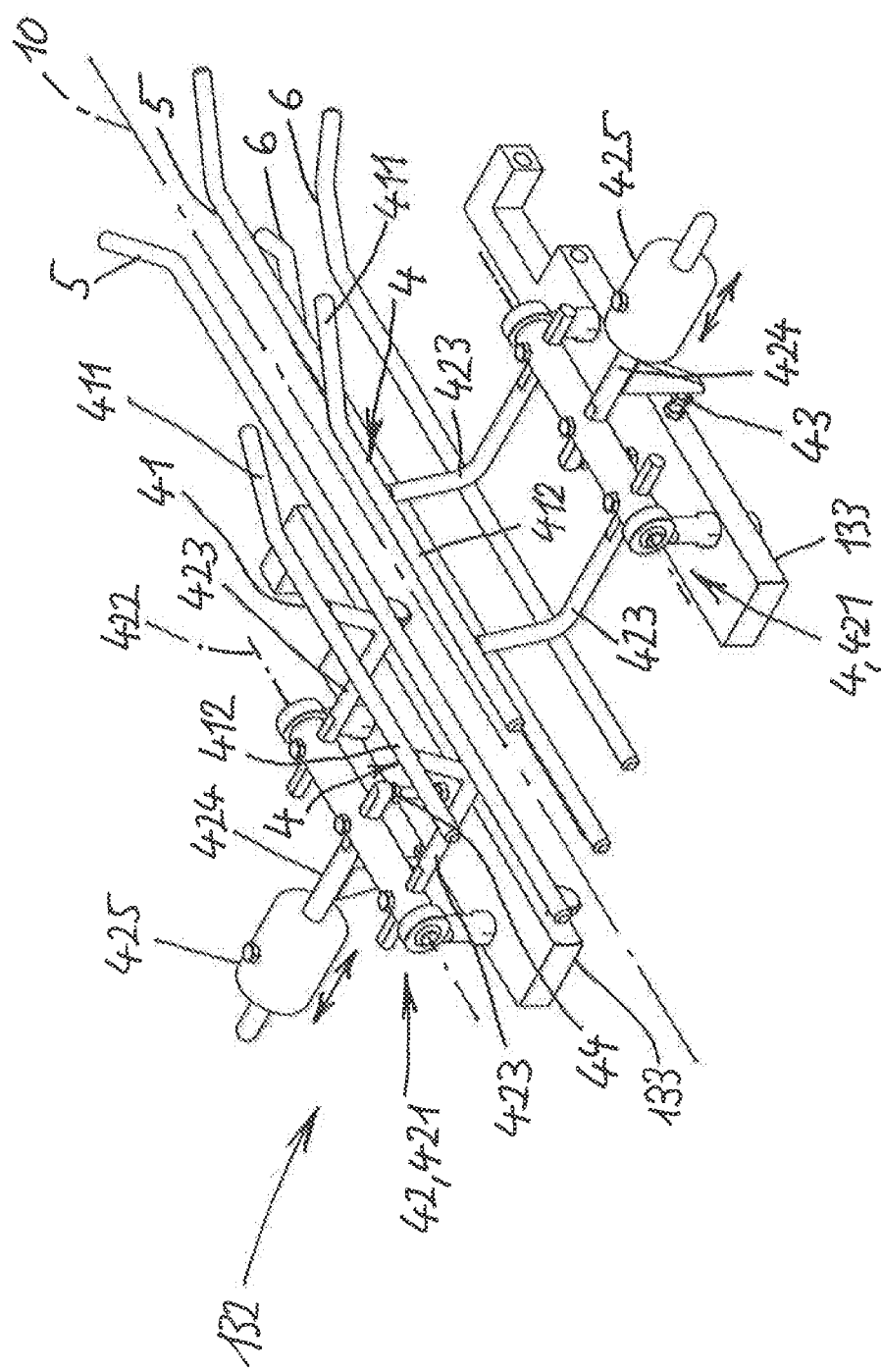

FIG. 1 shows, in a longitudinal view, a lifting apparatus according to the invention for lifting laterally conveyed poultry legs in a position in a poultry leg lifting way and in a lifted processing position in a reference conveying way, FIG. 2 shows, in an axonometric view, a carrier guiding device of a lifting apparatus according to the invention, and FIG. 3 shows, in a longitudinal view corresponding to FIG. 1, a lifting apparatus according to the invention with axially conveyed poultry legs.

As can be seen in FIG. 1, a lifting apparatus 1 according to the invention comprises a poultry leg lifting device 12 and also a carrier lifting device 13 having a carrier guiding device 132, which is associated with a poultry leg lifting way h, defined by a portion of a total conveying way, of the poultry leg lifting device 12 and is configured to cooperate with a lifting of the poultry leg 9 passing through the poultry leg lifting way h.

In order that important parts of the lifting apparatus 1 and the devices thereof are clearly visible in the drawing, support, frame and connecting parts, on which members, units, components in general are mounted and connected together, as well as drives, drive elements and similar elements, are not shown or are not shown in detail.

The lifting apparatus 1 is equipped with a conveying device 11 which has, along a straight conveying line 10, a row of poultry carriers 131 which are suspended at a uniform height and generally with a uniform spacing A from a conveying strand 111 and are conveyed in a direction of conveyance F by means of a conveying chain 112, for example. This is a typical overhead conveyor with poultry carriers 131 conveyed in a loop.

Each poultry carrier 131 has a foot hook-in device 31 which is provided on a foot carrying part 3 and is formed with U-shaped hangers 311 adjacent to one another in a pair in the direction of conveyance F, whereby a poultry leg 9 can be suspended by its ankle joint ball 911 in each hanger 311, namely for lateral conveying, that is to say with one of the two lateral leg sides between the front side of the leg and the rear side of the leg leading. In FIG. 1, in each case only a leading carrier hanger 311 of the hanger pair is provided with a left poultry leg. The other carrier hanger 311 is usually provided with the other, right poultry leg of a bird. Each poultry leg 9 is a part which has been separated completely from a slaughtered bird.

The poultry leg lifting device 12, as is known from document WO 2015/117668 A1, to which reference is made, comprises on the entry side, that is to say upstream, a leg bending device 7 and, following the leg bending device, downstream, a leg holding and guiding device 14. The leg bending device 7 is part of a poultry leg positioning device 70. In the exemplary embodiment, the poultry leg positioning device has stationary positioning elements 71 to 74 extending in the direction of conveyance F and also co-running positioning elements 75. The co-running positioning elements 75 are each associated with the conveyed poultry leg 9, with which they co-run. A positioning element 72 arranged upstream is a guide path running with the poultry leg lifting way h, with which each co-running positioning element 75 is lifted and brought with a lifting arm 750 into abutment on the thigh on the front leg side of the laterally conveyed poultry leg 9. The poultry leg 9 is thereby bent in the region of its knee joint in conjunction with the stationary positioning elements 71, 72 and at the start of the positioning element 74. In the course of the bending of the poultry leg 9, the poultry leg is lifted, whereby the hollow of the knee moves in a defined lifted, upper position against the positioning element 74, which has a guiding reference edge extending in the direction of conveyance F, at which the poultry leg 9 moves into a vertical reference position.

In the exemplary embodiment, the guiding reference edge merges at a conveying position R, which the poultry leg 9 passes in the vertical reference position, into a holding and guiding gap 141 of the leg holding and guiding device 14. The guiding reference edge inserts the poultry leg 9 in the upper position at the level of its knee joint 93 into the holding and guiding gap 141, whereby the poultry leg 9 is suspended, arranged vertically, by the knee joint in the holding and guiding gap 141 with the drumstick protruding upwards, as is shown in FIG. 1. By means of the poultry leg 9 suspended in the holding and guiding gap 141, the knee joint 93 thereof on the rear side of the leg is located in a reference position at any point along the holding and guiding gap 141. As can be seen in FIG. 1, the poultry leg 9 can be processed in that reference position. The leg holding and guiding device 14 is configured as a processing device for processing the poultry leg 9. A front-side cutting station 142, which is arranged on the entry side, has a cutting means 145, in the form of a circular knife, which is arranged above the holding and guiding gap 141. A following rear-side cutting station 143 is equipped with a cutting means 146, formed by a circular knife, which works above the holding and guiding gap 141.

During a general successive lifting of the poultry leg 9 along the poultry leg lifting way h in the leg bending device 7 and along a reference conveying way r through which the poultry leg 9 passes in the raised reference position, the poultry leg 9 is so oriented that the ankle joint ball 911 is also lifted with the poultry leg 9 or is and must be in a lifted position in order to ensure a defined vertical orientation of the poultry leg 9 during lifting and then in the lifted state in particular for processing. For this purpose, the carrier lifting device 13 having the carrier guiding device 132 is arranged and configured according to the invention. The unlifted poultry leg 9, as long as it is being conveyed upstream before reaching the poultry leg lifting device 12, is carried with its entire weight solely by means of the poultry carrier 131, whereby the ankle joint ball 911 is in many cases firmly seated, namely in a clamped or fixed manner, in the foot hook-in device 31, in the example in the carrier hanger 311. As the poultry leg 9 is lifted in the poultry leg lifting way h, the weight load of the poultry leg 9 is transferred to the lifting co-running positioning element 75 and finally to stationary parts such as rods and plates, which form the guiding reference edge, or the holding and guiding gap 141.

According to the invention, the carrier guiding device 132 of the carrier lifting device 13 is generally arranged next to the poultry leg lifting device 12, in such a manner that a lifting guiding member 4 of the carrier guiding device 132 is associated with a guiding way f of the poultry leg lifting way h and covers a portion of that guiding way until the vertical reference position is reached, as is shown in FIG. 1. As will be described in detail below, the lifting guiding member 4, as a dynamic lifting member, is so configured that it works in interplay with the leg bending device 7 of the poultry leg positioning device 70 during lifting of the poultry leg 9.

The poultry carriers 131 are also part of the carrier lifting device 13, each poultry carrier 131 being formed by a carrier suspension part 2 which is suspended at the same height from the conveying device 11, for example from the conveying strand 111 in such a manner that it is movable by rolling, and a foot carrying part 3 which is mounted vertically, preferably generally telescopically thereon. In the exemplary embodiment, the foot carrying part 3 is mounted on the carrier suspension part 2 by means of a sliding bearing 24 in such a manner that the foot carrying part 3, for vertical adjustment, is freely movable vertically in a straight direction V above a lower stop or blocking position. On the foot carrying part 3 there is formed the foot hook-in device 31 which, during normal transport of the poultry leg 9, that is to say in the suspended position, in which the poultry leg 9 loads the poultry carrier 131 with its full weight before it reaches the poultry leg lifting device 12, is in the lower stop/blocking position. Furthermore, there is arranged on the foot carrying part 3, in the exemplary embodiment at the upper end of a shaft 32, a carrier guiding element 33 which, as shown in FIG. 1 in the region of the guiding way f, or the poultry leg lifting way h, is provided for sliding engagement with the dynamic lifting guiding member 4 in the direction of conveyance F, in order to adjust the height of the foot carrying part 3 during the engagement.

The carrier guiding device 132, as is shown in FIG. 1 in arrangement with the leg bending device 7 of the poultry leg positioning device 70, is shown in detail in FIG. 2.

The carrier guiding device 132 has the dynamic lifting guiding member 4, which is designed to be symmetrical with all parts with respect to an imaginary vertical conveying mid-plane extending in the straight conveying line 10. The carrier guiding device 132 provided according to the exemplary embodiment is therefore described with reference to a symmetry half, wherein the parts belonging to the reference numerals are always to be understood in the symmetrical duplicate arrangement. It is generally possible to configure and provide the parts of the carrier guiding device without a duplicate arrangement.

A guiding bearing device 42 is arranged in a stationary manner on stationary frame parts 133, for example on support beams or bars of the apparatus frame (not shown). The guiding bearing device 42 is a lifting pivot bearing device 421 having a bearing pivot axis 422 parallel to the conveying line 10. A two-sided lever is pivotably mounted about that axis. A first lateral lever 423, formed by parallel rod parts, carries the dynamic lifting guiding member 4 in the form of a lifting guiding rod 41 extending according to the conveying line 10. The second lateral lever 424 carries a counter weight 425 as a restoring weight, which counteracts the weight with which the lifting guiding member 4, and thus the first lateral lever 423, is loaded. By means of the two-sided lever, the lifting guiding rod 41 is pivotable to and fro between two vertical positions, namely a lower stop position 44 and an upper stop position 43 parallel to the conveying line 10 with intermediate heights.

There are further arranged on the carrier guiding device 132 stationary guides attached to the frame parts 133, namely, in the mentioned symmetrical arrangement, a conveying guiding member 5 in the form of a horizontal guiding rod for sliding guiding and, likewise in a symmetrical arrangement, an unlocking control member 6 in the form of a rod, wherein the rods extend with the conveying line 10. The attachment of the conveying guiding member 5 and the unlocking control member 6 to the frame part 133 is not shown in FIG. 1 but is shown in FIG. 2.

A guiding length l, belonging to the guiding way f, of the lifting guiding member 4 is advantageously generally divided into two portions, namely into an ascending rising guiding portion 411 and a following horizontal guiding portion 412 fixed thereto, which portions are advantageously, as in the exemplary embodiment, one-piece components of the lifting guiding rod 41. In comparison with the horizontal guiding portion 412, the rising guiding portion 411 has only a small guiding length associated with a start region of the poultry leg lifting way h. Advantageously, the configuration is generally such that, as shown in FIGS. 1 and 2, the depth stop 44 limits the lower guiding position of the horizontal guiding portion 412 to a height which, at least, is, for example, level with or above the carrier guiding elements 33 guided with the conveying guiding members 5. The guided foot carrying parts 3 are then located along the guiding way f at a downwardly limited lifted suspension height. As can be seen in FIG. 1, the lifting guiding member 4 has—as is generally provided—a guiding length l which, at most, is approximately equal to and in any case smaller than the conveying distance A between two successive carrier guiding elements 33 or poultry carriers 131.

The carrier guiding device 132 designed and arranged according to the invention cooperates with the poultry leg positioning device 70 of the poultry leg lifting device 12 in a particular way. This is generally achieved in that, by means of the guiding bearing device 42, the lifting guiding member 4 is dynamically vertically movable by lowering and lifting, in dependence on the load with which the poultry carrier 131 in the associated portion of the poultry leg lifting way h is loaded or unloaded. The carrier guiding device 132 is so configured that the interplay is adjustable in particular in dependence on average weights of conveyed poultry legs 9 and/or on an average leg anatomy or size and is adaptable to lifting variations, as will be explained hereinbelow.

As discussed above, the ankle joint ball 911 of a poultry leg 9 at the normal suspension height of the foot hook-in device 31 is, as is assumed, clamped in the carrier hanger 311 as long as the foot carrying part 3, or the carrier guiding element 33 thereof, is out of engagement with the dynamic guiding member 4. Such a conveying position is shown upstream in FIG. 1. In FIG. 1, a position is then shown within the poultry leg lifting way h in which the poultry leg 9 has been lifted by the co-running positioning element 75, and thus the ankle joint ball 911, into a position at which the suspension height of the foot carrying part 3 in engagement with the lifting guiding member 4 has set itself. This is effected by the following procedure. On coming into contact with the carrier guiding element 33, which is guided by means of the conveying guiding member 5 into the carrier lifting device 13, a first weight unloading of the foot carrying part 3 occurs. The restoring force can be so adjusted, by displacement of the restoring/counter weight 425, that the foot carrying part 3 is lifted along the rising guiding portion 411 in order to adapt the suspension height to the lifting ankle joint ball 911. This lifting can be accompanied at the same time by a lowering of the lifting guiding member 4 by weight loading. In general, lifting can take place to a greater extent than lowering. The lifting guiding member 4 is, for example, so configured or adjusted that it is movable into a lower guiding position which establishes itself when the lifting guiding member 4 is loaded with a weight force greater than the restoring force. Upon further unloading of the foot carrying part 3, the lifting guiding member 4 rises and enters a neutral floating state, in which the weight load still acting on the foot carrying part 3 is balanced by the restoring force.

It is important that the lifting guiding member 4, in the floating state, is able to tilt or oscillate to and fro in a floating region around the bearing pivot axis 422. Depending on the adjustment of the restoring force, in the exemplary embodiment by means of the counter weight 425, the oscillating state can purposively be established at a desired point in the region of the poultry leg lifting way h, in order to adapt the floating region to the lifting region, in which the poultry leg 9 is successively lifted. Advantageously, the restoring force can be so adjusted, by displacement of the counter weight 425, that the lifting guiding member 4 already assumes a floating guiding position in a carrier insertion position, in which the foot carrying parts 3 come into engagement with the lifting guiding member 4. In particular, the first lifting then takes place at the start of the poultry leg lifting way h in combination with the small rising guiding portion 411 relative to the lifting guiding length. In principle, the adjustment takes place in such a manner that the greatest load on the foot carrying part 3, which occurs at the start of lifting of the poultry leg 9, is largely neutralised in the course of the lifting by the restoring force or the counter force. By successive weight unloading as a result of the lifting of the poultry leg 9 along the poultry leg lifting way h of the poultry leg lifting device 12, the lifting guiding member 4 pivots upwards, so that each foot carrying part 3 in engagement therewith, and thus the foot hook-in device 31 with carrier hangers 311, is successively smoothly lifted to suspension heights which correspond with the lifted heights of the ankle joint ball 911 of the poultry leg 9 on passing through the poultry leg lifting way h. The maximum lifting height is limited by the stop position 43. An ankle joint ball 911 clamped or otherwise fixed in the foot hook-in device 31, in the example in the carrier hanger 311, is freely deflected upwards with the guided foot hook-in device 31 upon lifting, so that interrupted operation or incorrect positioning upon lifting is reliably avoided.

In the exemplary embodiment according to FIG. 1, the guiding way f ends at a point at which a defined lifted ankle joint ball position has been reached, namely when the laterally conveyed poultry leg 9 comes or has come into abutment in the region of its knee joint 93 on the guiding reference edge. The guiding reference edge and then the holding and guiding gap 141 take over the guiding of the poultry leg 9 and are loaded with the weight thereof. At the defined lifted ankle joint ball position, the carrier guiding element 33 comes out of engagement with the lifting guiding member 4, so that the latter, before it comes into engagement with the foot carrying part 3 of the following poultry carrier 131, is moved back into a guiding starting position which is determined by the above-described adjustment of the restoring force with the desired floating position or stop position.

The lifting apparatus according to the invention is particularly advantageous when the poultry leg lifting device 12, as in the exemplary embodiment according to FIG. 1, has the leg holding and guiding device 14, which receives the poultry leg 9 at the mentioned defined lifted ankle joint ball position for holding and guiding. It remains necessary along the reference conveying way r that the ankle joint ball 911, which is clamped or otherwise fixed in the foot hook-in device 31, is not impeded by this fixing. Since the ankle joint ball 911 remains at the height of the defined lifted ankle joint ball position and may also additionally be lifted, although only slightly, in the intake region of the guiding reference edge, it is necessary that the foot carrying part 3 continues to be upwardly movable unhindered with the foot hook-in device 31 in order to ensure corresponding suspension heights, whereby the lifted ankle joint ball positions can also vary owing to anatomical structural differences in the conveyed poultry legs 9.

The foot carrying parts 3 of the poultry carriers 131 of the carrier lifting device 13 according to the invention remain vertically movable for vertical adjustment even after leaving the carrier guiding device 132. The ankle joint balls 911 conveyed along the reference conveying way r are already in lifted ankle joint ball positions, the poultry legs 9 being carried and supported in the region of the knee joint 93. Consequently, the foot carrying parts 3 are each completely freed of the weight of the poultry leg 9, with the effect that the foot carrying parts 3 fit the ankle joint balls 911 with sufficiently smooth vertical movability, as is shown downstream in the left-hand half of FIG. 1.

Only when the poultry carriers 131 leave the leg holding and guiding device 14 are they in each case moved downwards by means of the sliding bearing 24, whereby they strike a stop which holds them at the normal suspension height for transport of the poultry leg 9. By means of an arresting element 23, such as a locking lever or the like, which is shown only as a broken line, the foot carrying part 3 can be fixed preferably automatically at the normal suspension height on the carrier suspension part 2. This carrier lock is to be released before the poultry carrier 131 comes into engagement with the lifting guiding member 4. For this purpose, the carrier guiding device 132 is equipped with the guiding elements 6 which come into engagement with the arresting element 23 in order to unlock it.

The lifting device according to the invention can also be configured for the axial conveying of poultry legs which are to be lifted. An example of such a form is shown in FIG. 3. For identical or corresponding devices and elements, reference numerals which correspond to those in FIG. 1 are used. In this respect, reference is made for the description of the exemplary embodiment according to FIG. 3 to the description relating to FIG. 1.

The axial conveying according to FIG. 3 differs from the lateral conveying according to FIG. 1 in that the foot hook-in device 31 with the double carrier hanger of the poultry carrier 131 is rotated through 90° about the shaft 32 of the foot carrier part 3. The left and right poultry legs of a bird, separated from the bird, are conveyed with the leg side on which the patella is located leading. In FIG. 3, the poultry carriers 131 are shown with only the left poultry legs 9 being conveyed. Accordingly, for lifting, positioning and processing, only one poultry leg lifting device 12 with a poultry leg positioning device 70 and a leg holding and guiding device 14 for the left poultry legs 9 is shown. Devices which are not shown for lifting, positioning and processing the right poultry legs which are also conveyed in parallel by the poultry carriers 131 are configured correspondingly to the devices for the left poultry legs. The carrier guiding device 132 of the carrier lifting device 13 corresponds to the carrier guiding device 132 shown in FIG. 2, to the description of which reference is made.

The poultry legs 9, which according to FIG. 3 are conveyed in pairs by the foot hook-in devices 31, pass from the normal suspended position, as is shown upstream in FIG. 3, into the leg bending device 7 of the poultry leg positioning device 70, which together form the poultry leg lifting device 12. The devices 12, 70 and 7 are configured for bending, lifting and positioning the poultry legs 9 conveyed axially in pairs. Such an apparatus for the axial conveying of the poultry legs in pairs is described in detail in WO 2015/117668 A1, to which reference has already been made.

According to the invention, the carrier guiding device 132 is also associated in the exemplary embodiment of axial conveying according to FIG. 3 with the guiding length l along the guiding way f of the lifting way h of the leg bending device 7. Bending and positioning along an associated portion of the poultry leg lifting way h takes place by means of a stationary positioning element 76 having a ramp guide running upwards in the direction of conveyance F and having a row of co-running positioning elements 78 each associated with a poultry leg 9 and each having a positioning arm 780 which engages in the hollow of the knee of the poultry leg 9 conveyed with the front side of the leg leading. A stationary positioning element 77 forms a linear, straight routing. According to the invention, lifting of the poultry legs 9 along the portion of the lifting way h covered by the guiding way f is supported and promoted, the carrier guiding device 132 being so adjustable to the bending and lifting operation that in each case the foot hook-in device 31, in specific dependence on the weight unloading of the poultry leg 9 during lifting and positioning, passes into suspension heights which are adapted to a deflection or lifting of the ankle joint balls 911 during lifting and positioning.

The holding and guiding gap 141 of the leg holding and guiding device 14 is so configured that it receives each poultry leg 9 with the patella leading in the region of the knee joint, namely at a conveying point R at which, in the exemplary embodiment, the portion of the poultry leg lifting way h that belongs to the leg bending device 7 ends. At this point, the carrier guiding device 132 is also left at the end of the guiding way f. The poultry leg 9 thus passes into the reference conveying way r, the holding and guiding gap 141 forming reference edges and the poultry leg 9 passing into the vertical position shown downstream in FIG. 3, in which the ankle joint ball 911 is weight-unloaded and further lifted as a result of the poultry leg 9 being suspended by the holding and guiding gap 141. As described hereinbefore in relation to the exemplary embodiment of lateral conveying, the foot hook-in device 31 is then seated on the drumstick 91 beneath the ankle joint ball 911, or the ankle joint ball 911 is fixed, for example in a clamped manner, on the foot hook-in device 31.

The leg holding and guiding device 14 has a cutting station 147 with a pair of cutting means 148, formed by circular knives, which are arranged offset along the conveying way. In the cutting station 147, cuts are made beneath the holding and guiding gap 141 on the two lateral leg sides of the poultry leg 9 at the level of the knee joint. The cutting station 147 is followed by further processing stations (not shown) of the leg holding and guiding device 14.

The invention is not limited to the arrangement of the carrier guiding device 132 of the exemplary embodiments according to FIGS. 1 and 3. In particular, the described carrier guiding device 132 can, for example, purposively be associated with an end section of the leg bending device 7 and a starting section of the leg holding and guiding device 14. It is emphasised that the leg holding and guiding device 14 as such also lifts the poultry leg 9 after it has been threaded into the holding and guiding gap 141. Thus, the invention also includes, for example, an arrangement of the carrier guiding device 132 in which it is associated only with the leg holding and guiding device 14, in particular a starting section. It is also clear that the carrier guiding device according to the invention, for example in the form described by means of FIG. 2, can be arranged multiple times in a row one behind the other along a conveying way. Two adjacent carrier guiding devices may thereby follow one another directly or be spaced apart, depending on the use along the conveying way. In each case, the arrangement is defined in that the lifting guiding member 4 has a guiding length l which, at most, is equal to the conveying distance A between two successive poultry carriers 13.

The invention claimed is:

1. A lifting apparatus, configured to lift poultry legs conveyed suspended in a row, comprising
   a conveying device having poultry carriers which are movable along a conveying strand in a straight conveying line and in the direction of conveyance, wherein each poultry carrier has a carrier suspension part suspended from the conveying strand and a foot carrying part on which there is formed a foot hook-in device in which at least one poultry leg can be suspended by the ankle joint ball of the poultry leg for suspended conveying, a poultry leg lifting device which has a poultry leg positioning device having at least one positioning element associated with a poultry leg lifting way, which positioning element, outside the foot hook-in devices, with weight unloading of the poultry carrier, comes into engagement with the conveyed poultry legs in such a manner that the conveyed poultry legs, and thus the ankle joint balls thereof, can thereby be lifted in the poultry leg lifting way into lifted ankle joint ball positions, and a carrier lifting device comprising the poultry carriers and a carrier guiding device is arranged in the region of the poultry leg lifting device, wherein each poultry carrier carries the foot carrying part on the carrier suspension part in a freely vertically movable manner for vertical adjustment between a fixed lower suspension height and suspension heights lying above that lower suspension height, and wherein the carrier guiding device has a dynamically movable lifting guiding member, which is arranged in the region of the poultry leg lifting device with a guiding way associated with at least a portion of the poultry leg lifting way, and a guiding bearing device which carries the lifting guiding member, in conjunction with the weight unloading of the poultry carriers effected by the lifting of the poultry legs, in a dynamically vertically movable manner by lowering and lifting, wherein the lifting guide member is arranged for engagement with the foot carrying part, in such a manner that each foot hook-in device is lifted along the guiding way by the foot carrying part to suspension heights which correspond with the ankle joint ball positions lifted in the poultry leg lifting device.

2. The lifting apparatus according to claim 1, wherein the guiding way of the lifting guiding member has a guiding length which, at most, is equal to the conveying distance between two successive poultry carriers and ends at a conveying position of the poultry carrier at which a defined lifted ankle joint ball position is reached.

3. The lifting apparatus according to claim 1, wherein the lifting guiding member is formed by an ascending rising guiding portion and a following horizontal guiding portion, wherein the rising guiding portion has, in comparison with the horizontal guiding portion, a small guiding length.

4. The lifting apparatus according to claim 2, wherein the carrier guiding device has a height stop which determines a maximum lifting height of the guiding member.

5. The lifting apparatus according to claim 1, wherein the guiding bearing device is in the form of a device with which the lifting guiding member is vertically movable parallel to the straight conveying line.

6. The lifting apparatus according to claim 1, wherein the guiding bearing device carries the lifting guiding member against adjustable restoring force which, when the foot carrying part to be lifted engages with the lifting guiding member, counteracts a weight force which loads the lifting guiding member.

7. The lifting apparatus according to claim 6, wherein the lifting guiding member, in a carrier insertion position, in which the foot carrying parts come into engagement with the lifting guiding member, is movable into a lower guiding position which is established when the lifting guiding member is loaded with a weight force greater than the restoring force.

8. The lifting apparatus according to claim 7, wherein the lower guiding position is limited by a depth stop.

9. The lifting apparatus according to claim 8, wherein the depth stop limits the lower guiding position to a height at which the foot carrying parts are each situated at a lifted suspension height that is limited downwards.

10. The lifting apparatus according to claim 6, wherein the lifting guiding member, in a carrier insertion position, in which the foot carrying parts come into engagement with the lifting guiding member, is movable into a floating guiding position belonging to a floating region which is established when the lifting guiding member is loaded with a weight force that is balanced by the restoring force.

11. The lifting apparatus according to claim 1, wherein the lifting guiding member is so configured that, when the foot carrying parts engage with the lifting guiding member, it is simultaneously lifted and lowered in order to bring about a lifted guiding position.

12. The lifting apparatus according to claim 1, wherein the guiding bearing device is formed at least by a lifting pivot bearing device having a two-sided lever which has two lateral levers and is pivotable about a bearing pivot axis, wherein the first lateral lever carries the lifting guiding member and the second lateral lever carries a counter weight providing a restoring force.

13. The lifting apparatus according to claim 1, wherein there is arranged on each poultry carrier a controllable arresting element which blocks the vertical adjustment between the carrier suspension part and the foot carrying part, wherein the carrier guiding device of the lifting apparatus has an unlocking control member which, at a conveying position which is in advance of an insertion position of the poultry legs into the carrier lifting device, can be brought into engagement with the arresting element in order to enable the vertical adjustment between the carrier suspension part and the foot carrying part.

14. The lifting apparatus according to claim 1, wherein the foot hook-in devices of some poultry carriers are each formed by at least one hanger which allows at least some ankle joint balls to be lifted freely in the hanger when the poultry legs are lifted.

15. The lifting apparatus according to claim 1, wherein the foot hook-in devices of at least some poultry carriers are so designed that at least some ankle joint balls come to be fixed in the foot hook-in devices, blocking lifting in the foot hook-in devices.

16. The lifting apparatus according to claim 1, wherein the foot hook-in device is designed for the suspension of two poultry legs which are separate from one another and are to be conveyed one behind the other or side by side.

17. The lifting apparatus according to claim 16, wherein the poultry leg positioning device of the poultry leg lifting device is formed by a leg bending device having at least one positioning element which bends each conveyed poultry leg in the region of the knee joint and brings the ankle joint ball into a lifted ankle joint ball position.

18. The lifting apparatus according to claim 1, wherein the poultry leg lifting device comprises a leg holding and guiding device which holds and guides poultry legs conveyed by the poultry carriers in a reference conveying way with lifted ankle joint balls.

19. The lifting apparatus according to claim 18, wherein the leg holding and guiding device is so configured that it lifts the ankle joint balls from a lower position into an upper position.

20. The lifting apparatus according to claim 19, wherein the leg holding and guiding device has a holding and guiding gap in which the poultry legs can be suspended in a vertical orientation by their knee joints.

21. The lifting apparatus according to claim 18, wherein the guiding way of the lifting guiding member ends at a conveying position of the poultry carriers which is associated with the start of the reference conveying way, and in that the foot carrying parts are mounted on the carrier suspension parts in such a manner that they are vertically movable along the reference conveying way.

22. The lifting apparatus according to claim 18, wherein the guiding way of the lifting guiding member at least in part covers at least a portion of the reference conveying way.

23. The lifting apparatus according to claim 1, wherein the lifting guiding member is formed by a pair of lifting guiding rods which are formed and mounted symmetrically with respect to a vertical conveying mid-plane, and the foot carrying part of each poultry carrier has a carrier guiding element which can be attached to the pair of lifting guiding rods for engagement with the lifting guiding member.

* * * * *